United States Patent

[11] 3,551,632

| [72] | Inventors | Herbert Geisel<br>Herbert Geisel, Remscheid-Luttringhausen, Germany |
|---|---|---|
| [21] | Appl. No. | 786,299 |
| [22] | Filed | Dec. 23, 1968 |
| [45] | Patented | Dec. 29, 1970 |
| [73] | Assignees | AEG-Elothern GmbH<br>Remscheid-Hasten, Germany |
| [32] | Priority | Dec. 29, 1967 |
| [33] | | Germany |
| [31] | | No. 1,615,126 |

[54] METHOD OF MAINTAINING A CONSTANT OUTPUT VOLTAGE IN STATIC FREQUENCY CHANGERS
3 Claims, 1 Drawing Fig.

[52] U.S. Cl. .................................................. 219/10.43, 219/10.77
[51] Int. Cl. ................................................... H05b 5/00, H05b 5/04
[50] Field of Search .......................................... 321/4, 7, 447; 219/10.43, 10.77

[56] References Cited
UNITED STATES PATENTS

| 2,928,924 | 3/1960 | Rueggeberg ................ | 219/10.77 |
| 3,046,379 | 7/1962 | Keller et al. ................ | 219/10.43 |
| 3,247,444 | 4/1966 | Clarke et al. ................ | 321/4 |
| 3,436,641 | 4/1969 | Biringer ...................... | 321/7 |
| 3,436,642 | 4/1969 | Segsworth .................. | 321/7 |

Primary Examiner—J. V. Truhe
Assistant Examiner—L. H. Bender
Attorneys—Cushman, Darby and Cushman ABSTRACT: Inductive heating plant for heating small ingots at present in use consists of a static frequency changer comprising a rectifier unit for converting alternating current to direct current, a static inverter for converting the rectified current to alternating current by firing in turn silicon-controlled diodes, and an oscillatory circuit in parallel with the inverter in which the inductor for the said heating of ingots forms part of the oscillatory circuit. The invention provides a method of operating such plant whereby a rise in the direct current above the rated current for the static frequency changer is prevented, by controlling the operating frequency during the filling and emptying of the inductor with the ingots.

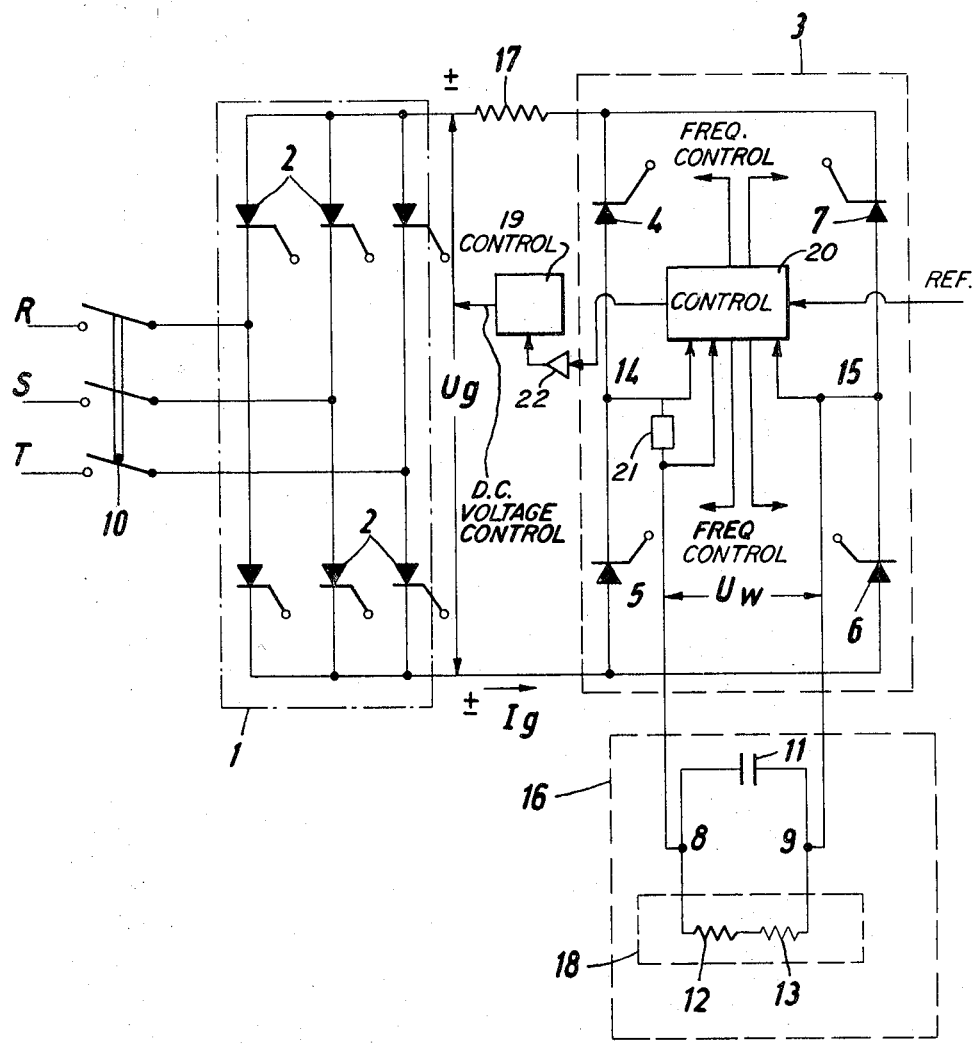

METHOD OF MAINTAINING A CONSTANT OUTPUT VOLTAGE IN STATIC FREQUENCY CHANGERS

This invention relates to the inductive heating of small metal ingots in an inductive heating circuit consisting of a static frequency changer, and particularly relates to the avoidance of a rise in direct current above the rated current for the said static frequency changer.

For inductively heating workpieces, medium-frequency rotary converters have in the past been exclusively used. The generator feeds a parallel oscillatory circuit comprising a capacitor set and the heating inductor. The capacitor set is divided into a permanently connected basic set and selectably connectable additional units. With the help of the latter the resonant frequency of the parallel oscillatory circuit can be tuned to the fixed operating frequency (medium frequency) of the generator. In this manner the generator delivers only effective power and no wattless power to the parallel oscillatory circuit. More particularly for heating ferromagnetic workpieces from room temperature to temperatures above the Curie point, the decreasing inductance of the heating inductor necessitates progressively bringing in further capacitor units to the basic capacitor set during the progress of heating. Since the power of excitation of the generator changes when fresh capacitance is added, the medium-frequency voltages delivered by the generator will change provided the exciting current remains constant. For this reason it is conventional practice to provide such equipment with a constant voltage device which adjusts the exciting current of the generator to keep the output voltage of the generator constant. Medium-frequency heating plant employing rotary converters therefore operates at constant frequency as well as at a constant output voltage.

In recent years heating installations have been proposed which use static frequency changers based on silicon-controlled diodes. The accompanying drawing is an illustrative example of the circuit of such a static frequency changer. The alternating voltage in the three main phases R, S, T is first rectified in a rectifier network 1 to a direct voltage $U_g$. This is done with the aid of semiconductor triodes 2, such as silicon-controlled rectifiers connected together in a three-phase bridge network. This direct current $U_g$ is applied via a smoothing choke 17 to an inverter 3 comprising silicon-controlled diodes 4, 5, 6, 7. When the main switch 10 is closed and a trigger pulse generator, not shown, controlling the inverter 3 is started, the silicon-controlled diodes 4, 5, 6, 7 are fired in rotation causing the polarities at the input terminals 8 and 9 of an oscillatory circuit 16 comprising a capacitor 11, an inductance 12 and an ohmic resistance to alternate. In order to prevent overloading the silicon-controlled diodes 4, 5, 6, 7, the operating frequency, i.e. the trigger frequency, is always slightly higher than the resonant frequency of the oscillatory circuit 16, the output of the inverter 14, 15 being capacitively slightly loaded by the capacitor 11. The output voltage $U_w$ of the inverter is easily controlled by varying the DC voltage $U_g$ by phase-cutting in the rectifier 1 with the aid of a controller 19. When the inverter 3 drives an oscillatory circuit 16 having a constant ohmic resistance 13, a constant inductance 12 and a constant capacitance 11 the direct current $I_g$ does not change. However, the direct current $I_g$ rises when the inductor 18 is say filled with or emptied of a charge of small metal ingots during the performance of a continuous process, because the ohmic resistance 13 and the inductance 12 change. When stationary workpieces are heated, such as ferromagnetic metal ingots, the direct current also rises. If it is desired in the same way as when using a rotary frequency changer, to keep the output voltage $U_w$ and the operating frequency of the rectifier-controlled static frequency changer constant, the rectifier 1 must be substantially overdimensioned. This can best be explained by giving a numerical example. The current $I_g$ through the rectifier can be calculated from the following equation $$(1) \quad I_g = \frac{\pi}{2\sqrt{2}} \cdot U_w \cdot wC \left(\frac{w_0}{w}\right)^2 \sqrt{\frac{w_0}{w} \cdot d_0 + \left[\left(\frac{w_0}{w}\right)^2 - 1\right]}$$

In this equation:
$U_w$ is the inverter output voltage,
$C$ is the capacitance of the oscillatory circuit,
$w$ is the operating frequency,
$w_0$ is the resonant frequency,
$d_0$ is the damping of the oscillatory circuit.

Assuming that the inductance 12 rises by 20 percent when the inductor 18 empties of metal ingots, then the resonant frequency $w_0$ will fall by 10 percent, the resonant frequency ratio between the filled and empty inductor 18 thus being 1 to 0.9. If the ratio of the operating frequency to the resonant frequency $\frac{w}{w_0}$ is assumed to be 1.05, then this frequency ratio at constant frequency will rise from 1.05 to $$\frac{1.05}{0.9} = 1.165.$$

If at the same time the damping $d_0$ of the inductor 18 decreases from 0.15 when the inductor is filled with metal ingots to 0.05 when the inductor is empty, then formula (1) shows that at constant operating frequency W and constant inverter output voltage $U_w$ the direct current $I_g$ must assume about 1.6 times its former value. The rectifier must therefore be overdimensioned by about 60 percent, a necessity which naturally substantially raises the cost of the static frequency changer because it needs correspondingly large silicon-controlled diodes.

It is the object of the present invention to avoid the rise in direct current above the rated level in static frequency changers comprising a controlled rectifier network, a static inverter and a parallel oscillatory circuit when the inductor is filled with or emptied of metal ingots, principally ferromagnetic metal ingots. To this end the invention consists in raising the operating frequency to the rated operating frequency of the inductor when this is filled with metal ingots and in correspondingly lowering the operating frequency during the emptying of the filled inductor in proportion to the ejection of the metal ingots, in a manner so that the angle between the passage through zero of the inverter output current and the following passage through zero of the inverter output voltage remaining constant. By this means the ratio of the inverter output voltage $U_w$ to the direct voltage $U_g$ remains constant. The angle between the passage through zero of the inverter output current and the following passage through zero of the inverter output voltage, representing the phase lag at the inverter output terminals 14 and 15, may be symbolized by $\gamma$.

The ratio of the inverter output voltage $U_w$ to the direct voltage $U_g$ is defined by the formula:

$$(2) \quad \frac{U_w}{U_g} = \frac{\pi}{2\sqrt{2}} \cdot \frac{1}{\cos \gamma}$$

and the power factor $\cos \gamma$, related to the inverter output 14 and 15 is $$(3) \quad \cos \gamma = \frac{1}{\sqrt{1 + \frac{1}{d_0^2} \cdot \frac{w}{w_0} \left[\left(\frac{w}{w_0}\right)^2 - 1\right]}}$$

If, as has already been assumed, damping in the inductor when this is filled with metal ingots is $d_0 = 0.15$ and the ratio of the operating frequency to the resonant frequency to the resonant frequency of the oscillatory circuit is $$\frac{w}{w_0} = 1.05,$$

, then the power factor according to equation (3) will be $\cos \gamma = 0.818$. Damping of the oscillatory circuit when the inductor is empty is $d_0 = 0.05$. In order to keep the power factor $\cos \gamma = 0.818$ unchanged when the inductor is empty, the ratio of operating frequency to resonant frequency $\frac{w}{w_0}$ must be 1.0175. Since the ratio of the resonant frequency of the inductor filled with metal ingots to that of the empty inductor is 1:0.9 the change of the operating frequency must be 13 percent. When metal ingots are heated in an inductor the operating frequency during the filling of the inductor with metal ingots is 13 percent below the rated operating frequency, and is raised to the rated operating frequency by the time the inductor is full, and it is then lowered from the rated operating frequency whilst the inductor is being emptied, in proportion to the ejection of metal ingots from the inductor. If during the filling and emptying of the inductor the operating frequency is thus lowered below the rated operating frequency and the power factor is at the same time kept constant, then the direct current will not rise during the filling and emptying of metal ingots into and from the inductor. In order to determine the angle $\gamma$ between the passage through zero of the output current of the inverter and the following passage through zero of the output voltage of the inverter, this is measured as a variable value by any conventional method such as by sensing the voltage between leads 14 and 15 and a signal proportional to the output current passing through sensor 21 and comparing this in control device 20 with a reference value and the error signal between variable and reference values is applied to means adapted to change the operating frequency so as to maintain the error at zero or substantially zero.

I claim:

1. A method for avoiding a rise in direct current above a rated current value in a static frequency changer adapted for inductively heating metal ingots in an inductive heating circuit including said static frequency changer which comprises a rectifier unit and a silicon-controlled diode static inverter having a controllable operating frequency output current and voltage for operative connection with a parallel oscillatory circuit including an inductor for inductively heating said metal ingots, said method comprising the steps of:

raising said operating frequency of said static frequency changer to a rated inductor frequency during the filling of said inductor with metal ingots;

lowering said operating frequency during discharge of said metal ingots from said inductor in proportion to the amount of metal ingots discharged;

maintaining said operating frequency higher than the resonance frequency of said parallel oscillatory circuit during both of the above steps of raising and lowering said operating frequency; and maintaining substantially constant the phase angle between the passage through zero of said output current and the following output through zero of said output voltage from said static inverter.

2. A method as in claim 1 further comprising the steps of:

measuring as a variable said angle between the passage through zero of said output current and the following passage through zero of said output voltage;

comparing said variable with a reference value to provide a deviation signal therefrom; and applying said deviation signal to means for changing the operating frequency thereby maintaining said deviation at a substantially zero value.

3. A method as in claim 4 wherein said rectifier unit comprises a controlled semiconductor rectifier unit.